(12) United States Patent
Chen

(10) Patent No.: US 10,900,213 B2
(45) Date of Patent: Jan. 26, 2021

(54) FLUSH VALVE WITH A POWER GENERATION FUNCTION

(71) Applicant: Sheng-Hsien Chen, Taoyuan (TW)

(72) Inventor: Sheng-Hsien Chen, Taoyuan (TW)

( * ) Notice: Subject to any disclaimer, the term of this patent is extended or adjusted under 35 U.S.C. 154(b) by 206 days.

(21) Appl. No.: 16/234,733

(22) Filed: Dec. 28, 2018

(65) Prior Publication Data

US 2020/0208389 A1 Jul. 2, 2020

(51) Int. Cl.
*E03D 5/00* (2006.01)
*E03D 5/10* (2006.01)
*F03B 11/00* (2006.01)
*F03B 3/04* (2006.01)
*E03D 3/06* (2006.01)

(52) U.S. Cl.
CPC ............... *E03D 5/105* (2013.01); *E03D 3/06* (2013.01); *F03B 3/04* (2013.01); *F03B 11/004* (2013.01)

(58) Field of Classification Search
CPC ......... E03D 5/105; E03D 3/06; F03B 11/004; F03B 3/04; F16K 21/00; F16K 31/402
See application file for complete search history.

(56) References Cited

U.S. PATENT DOCUMENTS

| | | | | |
|---|---|---|---|---|
| 2002/0092090 A1* | 7/2002 | Johnson | ................. | E03D 5/105 4/302 |
| 2002/0162166 A1* | 11/2002 | Saar | ........................ | E03D 5/105 4/302 |
| 2008/0029722 A1* | 2/2008 | Irwin | .................... | F16K 47/023 251/45 |
| 2013/0008542 A1* | 1/2013 | Irwin | ...................... | G01F 1/075 137/859 |

* cited by examiner

*Primary Examiner* — Kelsey E Cary
(74) *Attorney, Agent, or Firm* — Alan D. Kamrath; Mayer & Williams PC

(57) ABSTRACT

A flush valve has a valve body having a flushing tube, a power generating set, and a solenoid valve assembly. The power generating set is disposed within the flushing tube and has a turbine capable of rotating, an induction coil, and a magnet inserted through the induction coil and capable of simultaneously rotating with the water turbine. The solenoid valve assembly has an assembling mount, a solenoid valve assembled to the assembling mount, and a power supply electrically connected to both the induction coil and the solenoid valve. A first reserving space is formed between the assembling mount and a relief assembly. A second reserving space is formed between the solenoid valve and the assembling mount and communicates with the first reserving space. The solenoid valve optionally prevents the first reserving space and the second reserving space from communicating with each other.

18 Claims, 10 Drawing Sheets

FLUSH VALVE WITH A POWER GENERATION FUNCTION

BACKGROUND OF THE INVENTION

1. Field of the Invention

The present invention relates to a flush valve, and more particularly to a flush valve with a power generation function.

2. Description of Related Art

A flush valve is applied to public restrooms. The flush valve is equipped in coordination with urinals, squat toilets, or seated toilets. With reference to FIGS. 8 and 9, a conventional flush valve has a valve body 70, a relief assembly 80, and a manual assembly 90. The relief assembly 80 and the manual assembly 90 are assembled to the valve body 70.

The valve body 70 has a flushing tube 71 and an inlet port 72. The flushing tube 71 has an intake end and an outlet end opposite each other in an longitudinal direction of the flushing tube 71. The inlet port 72 communicates with the intake end of the flushing tube 71 and is connected to a water supply.

The relief assembly 80 has a guiding member 81, a restricting disk 82, a relief valve 83, a diaphragm 84, and an inside cover 85. The guiding member 81 is tubular and is inserted into the flushing tube 71. The restricting disk 82 is fixed to the guiding member 81 and is disposed adjacent to the intake end of the flushing tube 71. The restricting disk 82 has a through hole 821 communicating with inside of the guiding member 81.

The relief valve 83 is assembled to the restricting disk 82 and has a valve head 831 and a valve stem 832. The valve head 831 blocks the through hole 821. The valve stem 832 is connected to the valve head 831, passes through the through hole 821 and the guiding member 81, and extends into the flushing tube 71. The diaphragm 84 is circular and is mounted on and around the guiding member 81. The diaphragm 84 is disposed between the restricting disk 82 and the intake end of the flushing tube 71. The diaphragm 84 is elastic and has a central portion capable of rising upward such that the inlet port 72 and the intake end of the flushing tube 71 communicate with each other. The central portion of the diaphragm 84 is capable of sinking downward to block the inlet port 72 and the intake end of the flushing tube 71. The diaphragm 84 has multiple communicating holes 841 disposed around the guiding member 81. The multiple communicating holes 841 are multiple through holes.

The inside cover 85 is made of metal or plastic and is disposed above the relief valve 83. A first reserving space S1 is formed between the inside cover 85 and the restricting disk 82 for storing water. The water reserving space S1 communicates with the inlet port 72 via the multiple communicating holes 841.

The manual assembly 90 has a manual handle 91 disposed outside the valve body 70 and a plunger 92 that is connected to the manual handle 91. The plunger 91 enters the valve body 70.

Water introduced from the water supply enters the water reserving space S1 via the multiple communicating holes 841 of the diaphragm 84. Water in the water reserving space S1 presses the diaphragm 84 to sink the central portion of the diaphragm 84 and to prevent the inlet port 72 and the intake end of the flushing tube 71 from communicating with each other.

When the manual handle 91 is pressed, the plunger 92 pushes the valve stem 832, and the valve head 831 no longer blocks the through hole 821. Water in the water reserving space S1 enters the guiding member 81 via the through hole 821 and discharges from the outlet end of the flushing tube 71. When the diaphragm 84 is no longer subjected to pressure provided from the water reserving space S1, the central portion of the diaphragm 84 rises such that the inlet port 72 and the intake end of the flushing tube 71 communicate with each other. Water from the water supply is directly introduced into the flushing tube 71 and discharges at large flows.

In order to promote user experience of restrooms, flush valves with a sensor-operating function are commonly applied to public restrooms. The flush valves with sensor-operating function can avoid the user's direct contact with the manual handle 91 and is more hygienic in use. With the sensor-operating function, the flush valves can detect practical usage condition and modify flow accordingly for saving water. However, to replace the conventional flush valve by the flush valve with the sensor-operating function, the conventional flush valve has to be completely removed and consumes a lot of time and money. Moreover, the flush valves with the sensor-operating function are inconvenient since batteries must be replaced regularly.

To overcome the shortcomings of the conventional flush valve, the present invention provides a flush valve with a power generation function to mitigate or obviate the aforementioned problems.

SUMMARY OF THE INVENTION

The main objective of the present invention is to provide a flush valve that can easily be modified to be equipped with a power generation function.

The flush valve comprises a valve body having a flushing tube, a power generating set, and a solenoid valve assembly. The power generating set is disposed within the flushing tube and has a turbine capable of rotating, an induction coil, and a magnet inserted through the induction coil and capable of simultaneously rotating with the water turbine. The solenoid valve assembly has an assembling mount, an solenoid valve assembled to the assembling mount, and a power supply electrically connected to both the induction coil and the solenoid valve. A first reserving space is formed between the assembling mount and a relief assembly. A second reserving space is formed between the solenoid valve and the assembling mount and communicates with the first reserving space. The solenoid valve optionally prevents the first reserving space and the second reserving space from communicating with each other.

Other objects, advantages, and novel features of the invention will become more apparent from the following detailed description when taken in conjunction with the accompanying drawings.

DETAILED DESCRIPTION OF PREFERRED EMBODIMENTS

Figure 1:
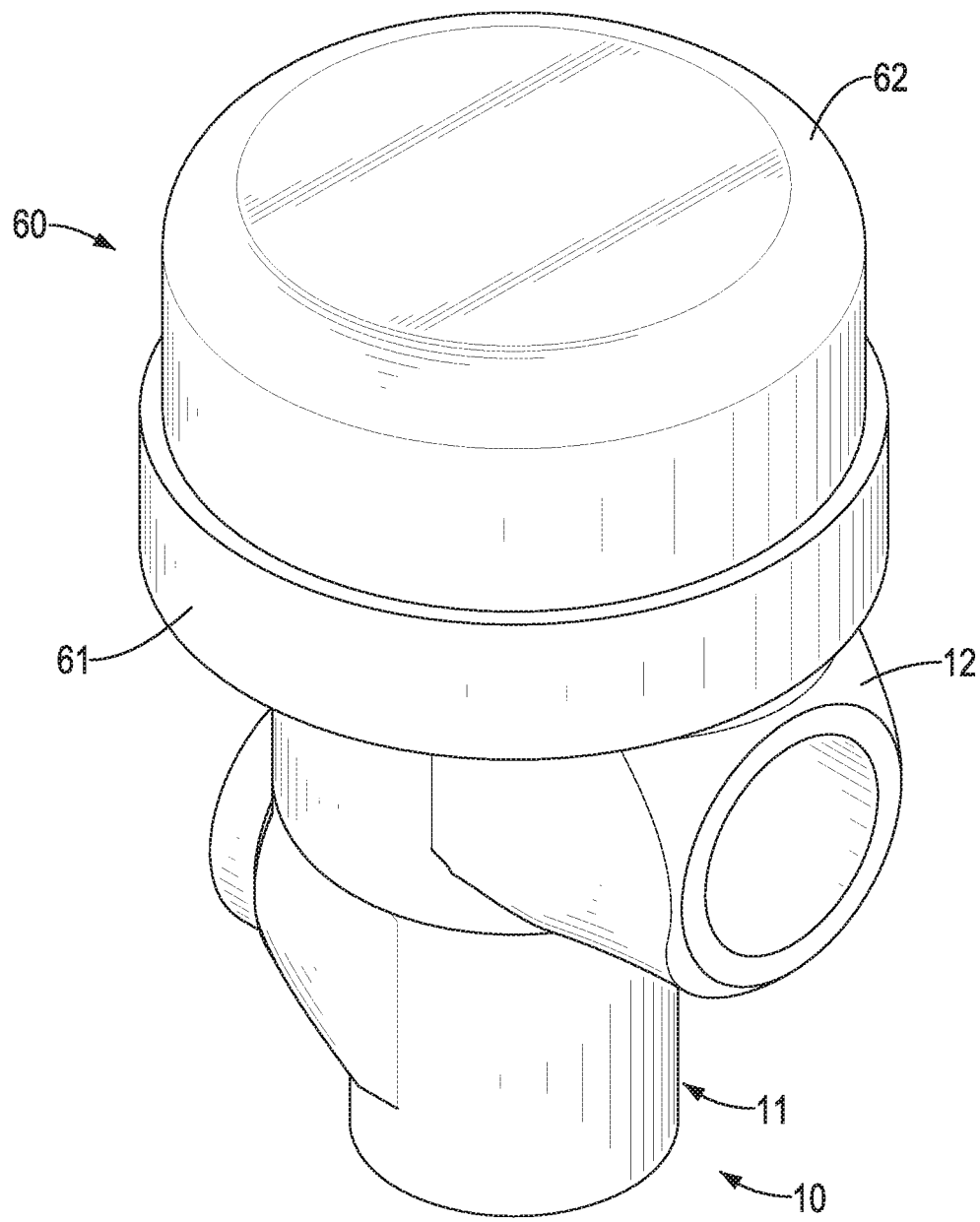
FIG. 1 is a perspective view of a flush valve in accordance with the present invention.
Figure 2:
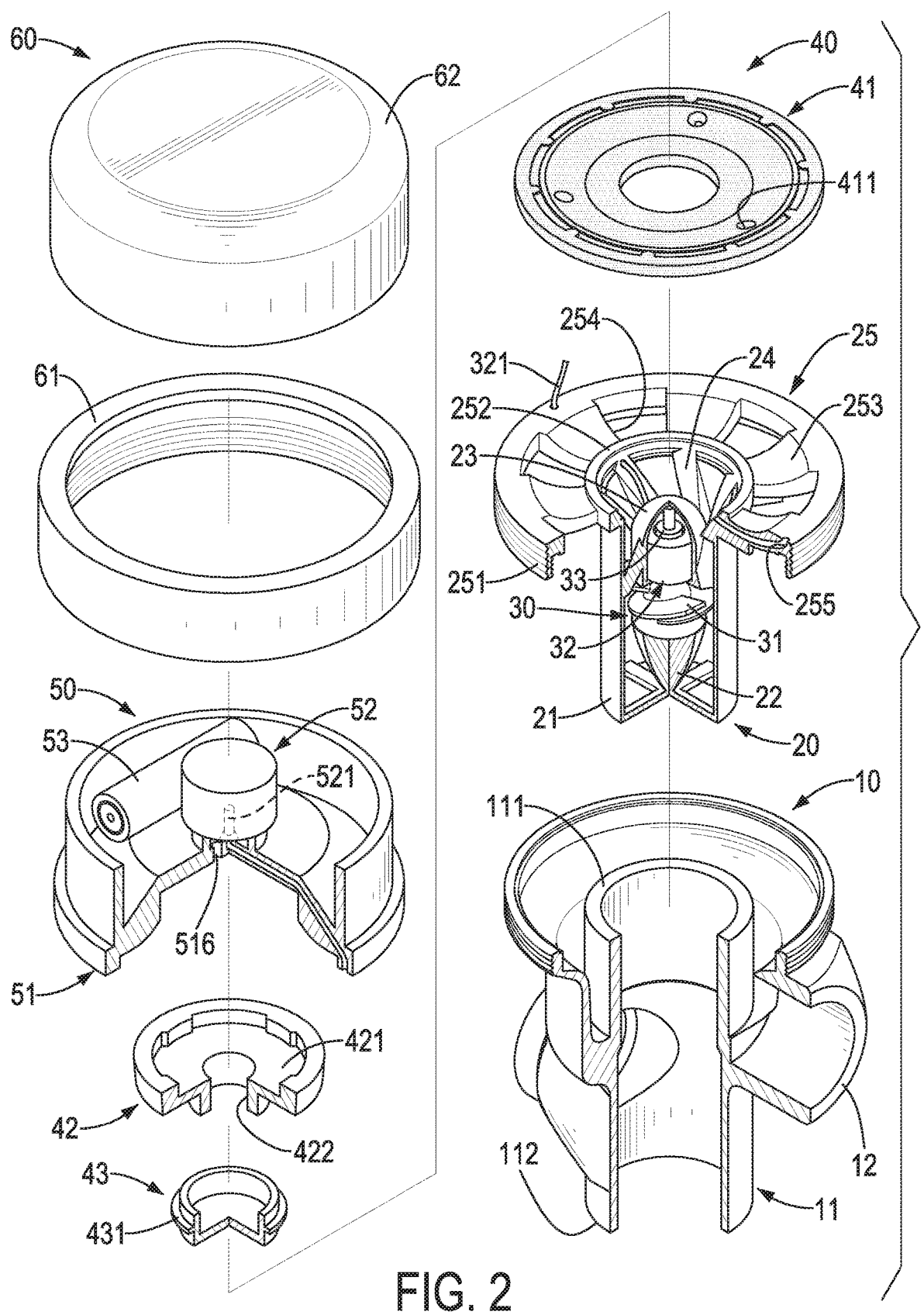
FIG. 2 is a partially exploded perspective view of the flush valve in FIG. 1.

With reference to FIGS. 1 and 2, a flush valve with a power generation function in accordance with the present invention has a valve body 10, an assembling unit 20, a power generating set 30, a relief assembly 40, a solenoid valve assembly 50, and a covering set 60. The assembling unit 20, the power generating set 30, the relief assembly 40, the solenoid valve assembly 50, and the covering set 60 are assembled to the valve body 10.

Figure 3:
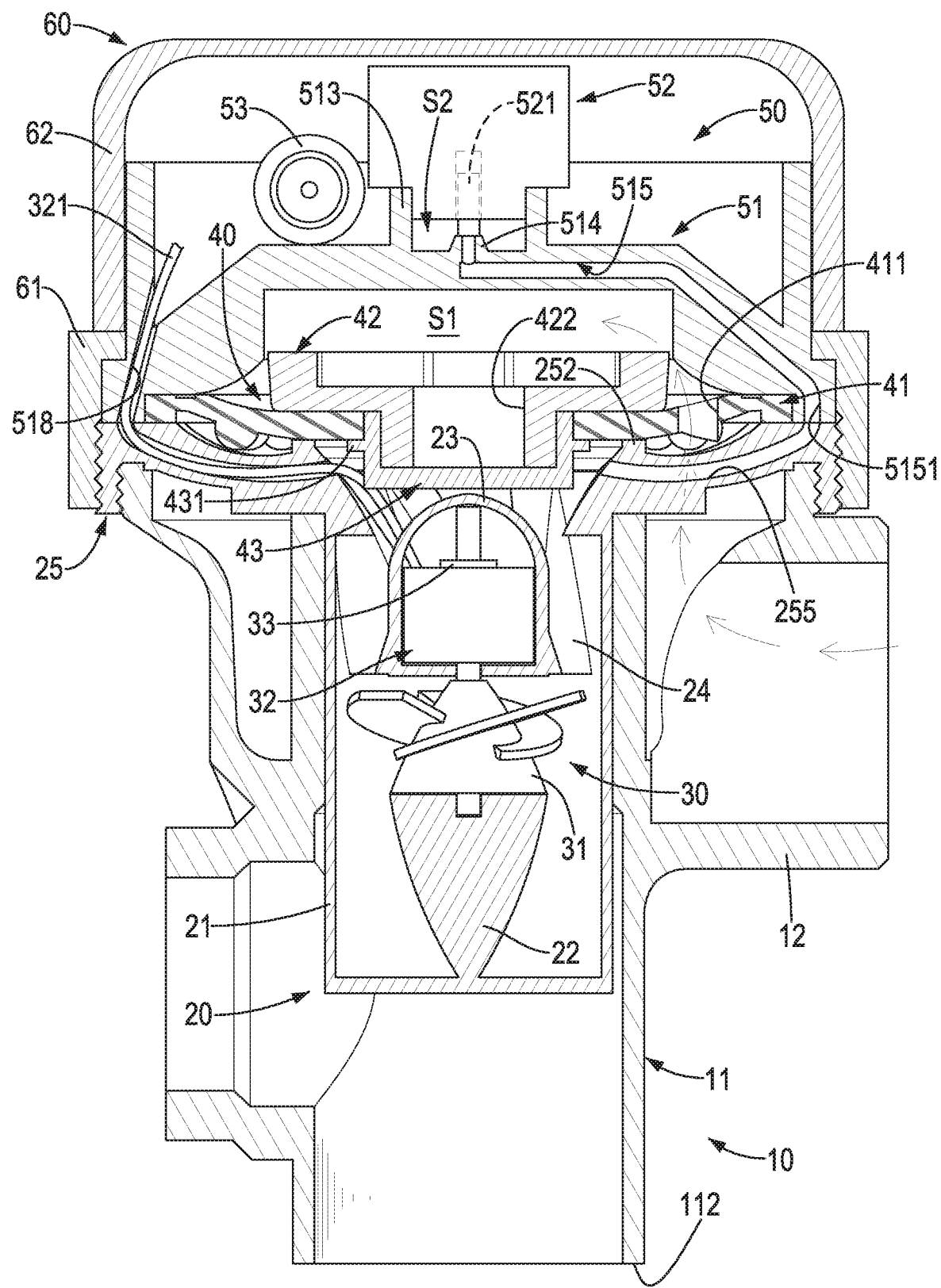
FIG. 3 is an enlarged side view in partial section of the flush valve in FIG. 1.

With reference to FIGS. 2 and 3, the valve body 10 has a flushing tube 11 and an inlet port 12. The flushing tube 11 is disposed at a central position on the valve body 10 and has an axial direction, an intake end 111, and an outlet end 112 opposite each other in the axial direction of the valve body 10. The intake end 111 and the outlet end 112 of the flushing tube 11 are opposite each other. In FIGS. 2 and 3, the intake end 111 and the outlet end 112 of the flushing tube 11 are respectively disposed at an upper position and a lower position of the flushing tube 11. The inlet port 12 communicates with the intake end 111 of the flushing tube 11.

With reference to FIGS. 2 and 3, the assembling unit 20 is an integrated single component and may be made of plastic with formability. The assembling unit 20 has a conducting tube 21, a turbine seat 22, a containing shell 23, multiple diverging ribs 24, and a seal 25. The conducting tube 21 has two opposite ends. The turbine seat 22 is conical, is disposed within the conducting tube 21, and is connected to one of the two opposite ends of the conducting tube 21. The containing shell 23 is hollow, is disposed within the conducting tube 21, and is disposed adjacent to the other one of the two opposite ends of the conducting tube 21. The multiple diverging ribs 24 are disposed within the conducting tube 21 and surround the containing shell 23. Each one of the multiple diverging ribs 24 spirally extends from the conducting tube 21 to the containing shell 23 according to the containing shell 23 and is connected to both the connecting shell 23 and the conducting tube 21.

With reference to FIGS. 2 to 5, the seal 25 is connected to the conducting tube 21 and is disposed adjacent to the containing shell 23. The seal 25 has a mounting ring 251, a communicating ring 252, multiple connecting portions 253, multiple communicating openings 254, and two channels 255. The communicating ring 252 is coaxially disposed within the mounting ring 251. The multiple connecting portions 253 are disposed between the mounting ring 251 and the communicating ring 252 and surround the communicating ring 252 separately. Each one of the multiple connecting portions 253 radially extends and is connected to both the mounting ring 251 and the communicating ring 252. The multiple communicating openings 254 are disposed around the communicating ring 252 separately. Each one of the multiple communicating openings 254 is disposed between two adjacent connecting portions 253 of the multiple connecting portions 253.

The two channels 255 are respectively formed through two of the multiple connecting portions 253 that are opposite each other in a diametric direction of the seal 25. Each one of the two channels 255 is defined in a top face of the seal 25 and extends inside the communicating ring 252.

With reference to FIGS. 2 to 5, the conducting tube 21 of the assembling unit 20 is inserted inside the flushing tube 11. The turbine seat 22 is disposed within the conducting tube 21, the containing shell 23, and the multiple diverging ribs 24 are disposed within the flushing tube 11. The mounting ring 251 of the seal 25 is screwed with the valve body 10. The communicating ring 252 communicates with the conducting tube 21 and communicates with the flushing tube 11 via the conducting tube 21.

With reference to FIGS. 2 to 5, the power generation set 30 is assembled to the assembling unit 20 and is disposed within the flushing tube 11. The power generation set 30 has a water turbine 31, an induction coil 32, and a magnet 33. The water turbine 31 is rotatably assembled to the turbine seat 22 of the assembling unit 20 and is disposed between the turbine seat 22 and the containing shell 23. The water turbine 31 is capable of rotating along the axial direction of the flushing tube 11. The induction coil 32 is circular and is disposed within the containing shell 23 of the assembling unit 20. The induction coil 32 has a conductive wire 321 inserted inside one of the two channels 255. The magnet 33 is inserted through the induction coil 32, is coaxially connected to the water turbine 31, and is capable of simultaneously rotating with the water turbine 31.

Figure 4:
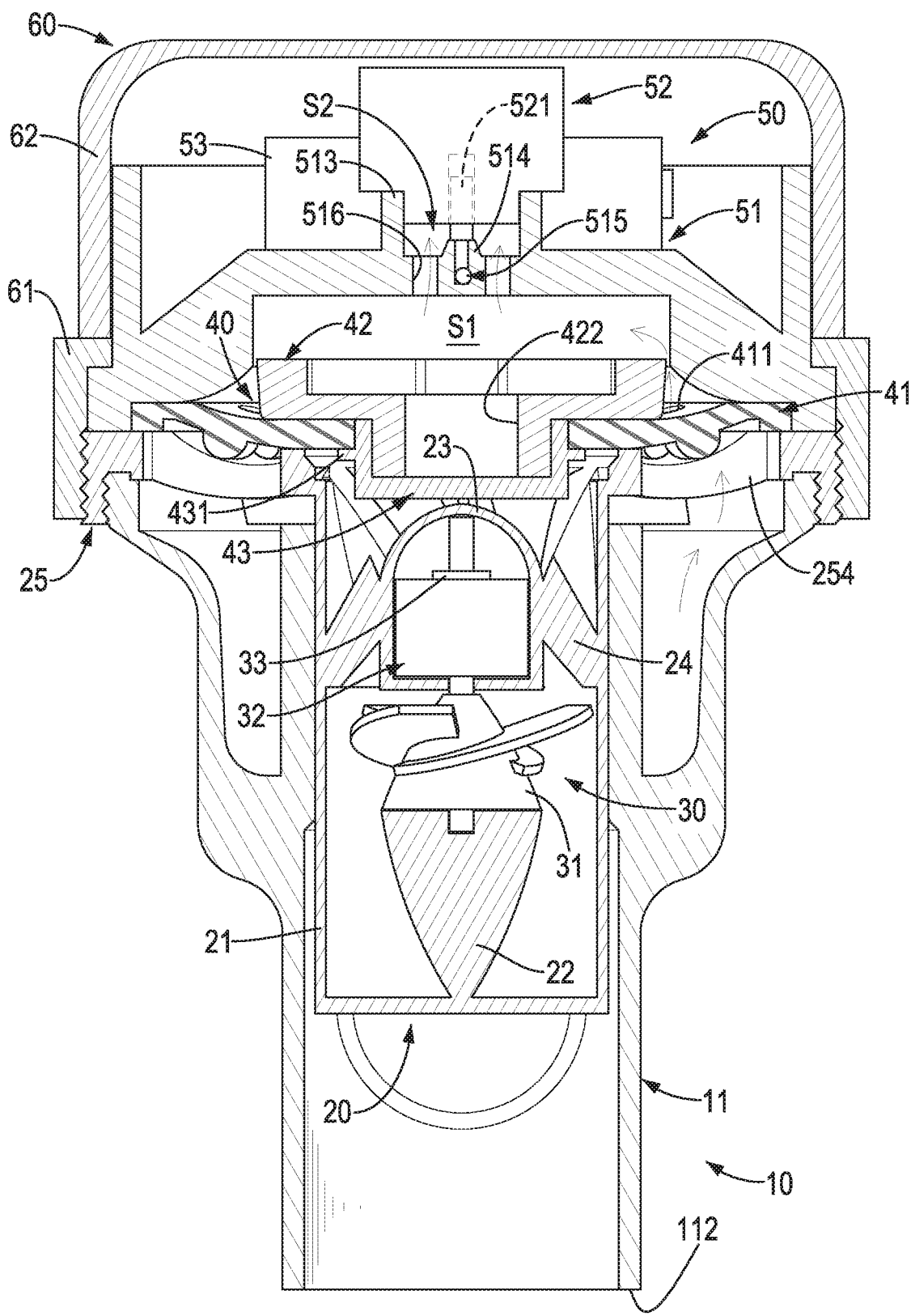
FIG. 4 is another enlarged side view in partial section of the flush valve in FIG. 1.
Figure 5:
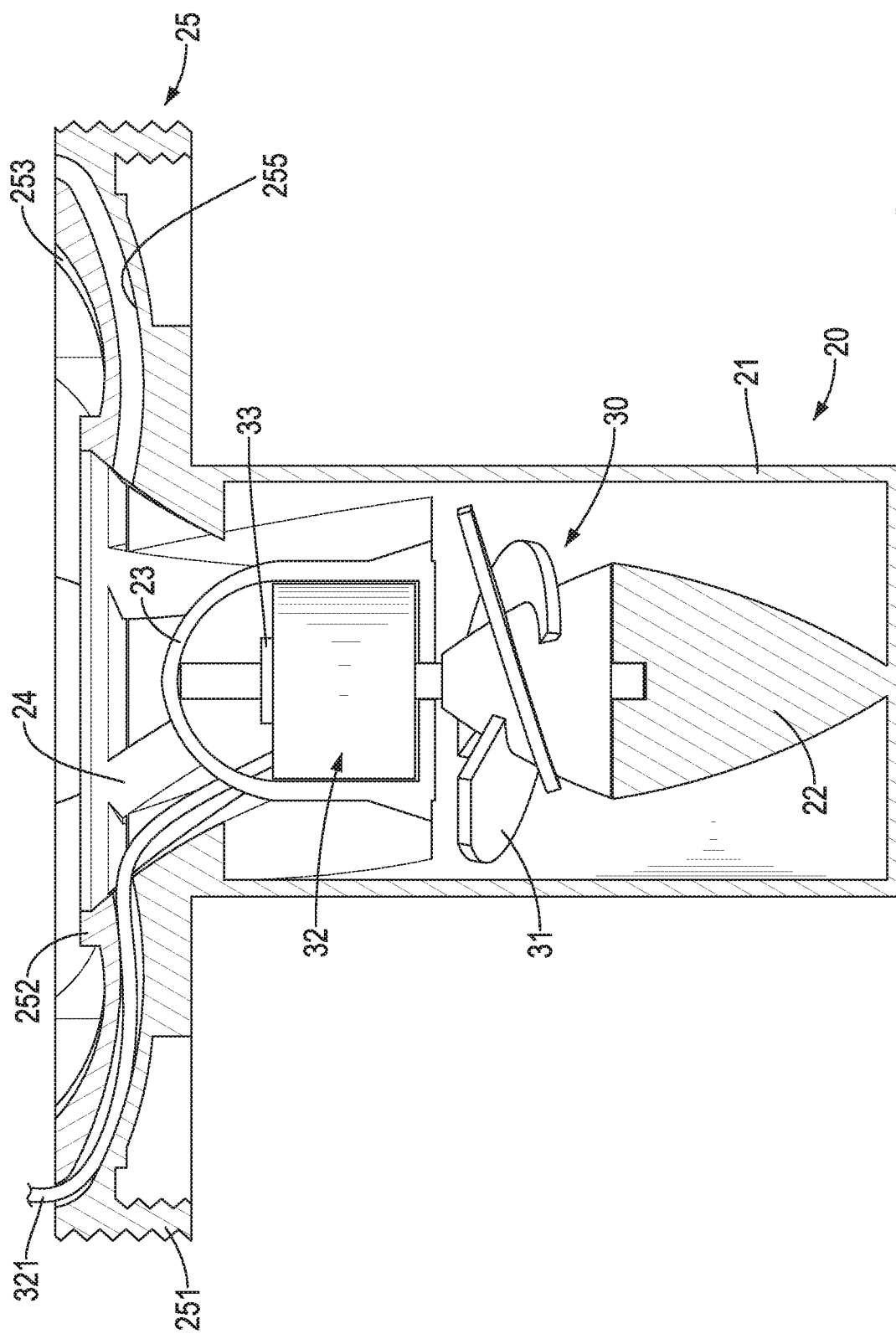
FIG. 5 is a further enlarged side view in partial section of the flush valve in FIG. 1.
Figure 6:
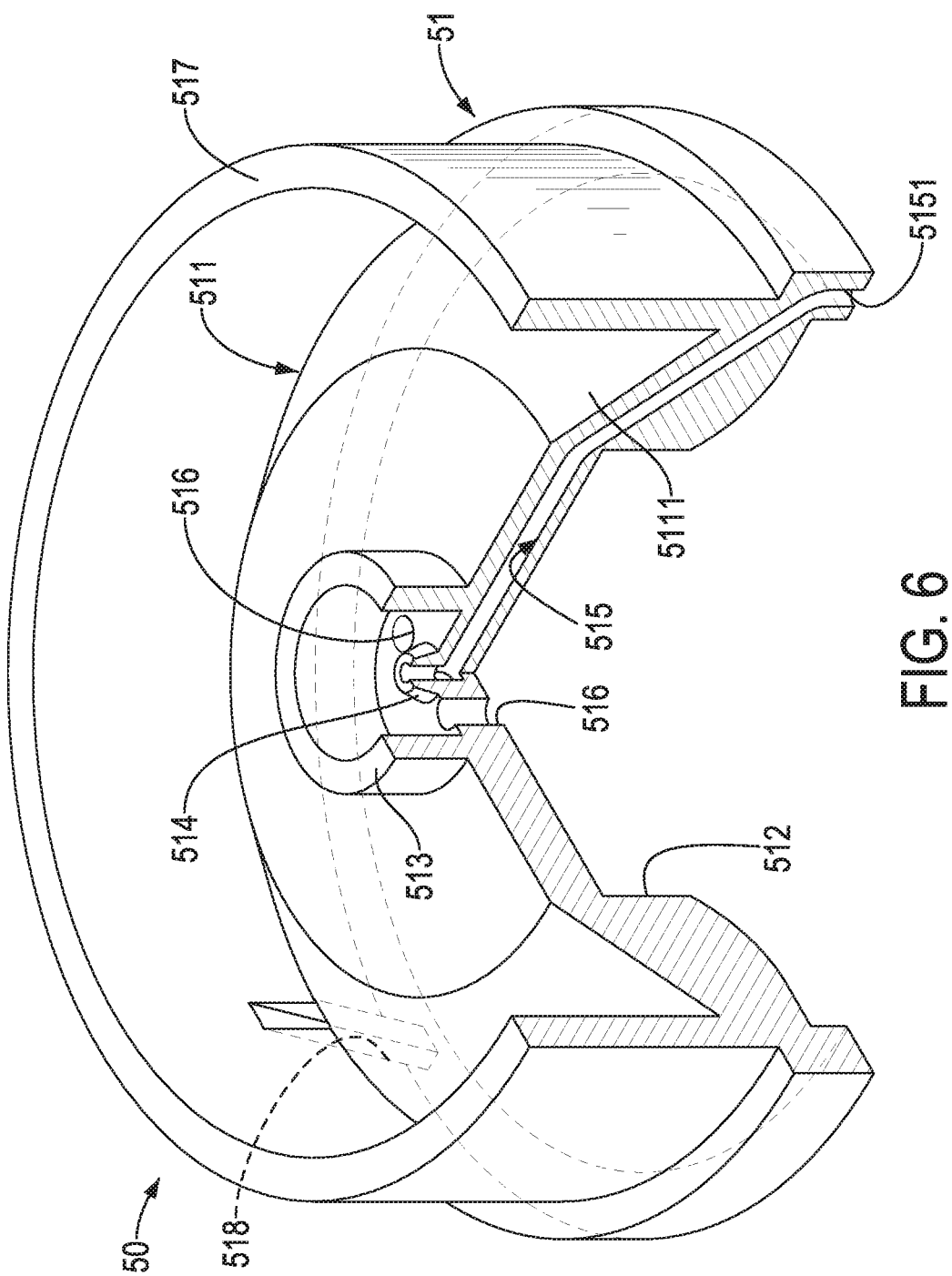
FIG. 6 is an enlarged perspective view in partial section of an assembling mount of the flush valve in FIG. 1.

With reference to FIGS. 2, 3, and 4, the relief assembly 40 has a diaphragm 41, a restricting disk 42, and a blocking cap 43. The diaphragm 41 is made of rubber, silicone rubber, or other elastics. Therefore, a central portion of the diaphragm 41 is capable of rising or sinking. The diaphragm 41 is circular and has multiple communicating holes 411 disposed annularly. The diaphragm 41 is disposed above the seal 25 of the assembling unit 25 and abuts against the seal 25. The restricting disk 42 is mounted through the diaphragm 41 and is disposed adjacent to the intake end 111 of the flushing tube 11. The restricting disk 42 is capable of rising or sinking with the diaphragm 41. The restricting disk 42 has a receiving recess 421 and a through hole 422 defined through a bottom of the receiving recess 421. The blocking cap 43 is mounted on and around the restricting disk 42, is inserted in the diaphragm 41, is clamped by the diaphragm 41 and the restricting disk 42, and blocks the through hole 422. In the embodiment of the present invention, the blocking cap 43 has a flange being circular and abutting against the diaphragm 41.

With reference to FIGS. 2 to 6, the solenoid valve assembly 50 has an assembling mount 51, a solenoid valve 52, and a power supply 53. The assembling mount 51 is made of rubber, silicone rubber, or other elastics and has a disk 511, a reserving recess 512, a baffle wall 513, a conical protrusion 514, a flow channel 515, two flow holes 516, a circular wall 517, and a wiring hole 518. The disk 511 has two opposite sides and a disk surface 5111 disposed at one of the two opposite sides of the disk 511. The reserving recess 512 is disposed at the other one of the two opposite sides of the disk 511 and is defined in a central portion of the disk 511. The baffle wall 513 is circular, is connected to the disk surface 5111, and is disposed at the central portion of the disk 511. The conical protrusion 514 is connected to the disk surface 5111 of the disk 511, is disposed at the central portion of the disk 511, and is disposed within the baffle wall 513.

The flow channel 515 is defined through the conical protrusion 514 disposed at the central portion of the disk 511. The flow channel 515 extends inside the disk 511, extends along a diametric direction of the disk 511, and extends to a rim of the disk 511 to form an opening 5151 corresponding to one of the two channels 255. The two flow holes 516 are defined through the central portion of the disk 511, communicate with the reserving recess 512, and are disposed within the baffle wall 513. The circular wall 327 is connected to the disk surface 5111 of the disk 511 and surrounds the baffle wall 513. The wiring hole 518 is defined through the disk 511 and is aligned with the other one of the two channels 255.

With reference to FIGS. 2, 3, and 4, the assembling mount 51 is disposed above the relief assembly 40 and abuts against the diaphragm 41 of the relief assembly 40. The opening 5151 of the flow channel 515 is aligned and communicates with said one of the two channels 255 mentioned above. The wiring hole 518 is aligned with the other one of the two channels 255. A first reserving space S1 is disposed between the reserving recess 512 and the relief assembly 40. The first reserving space S1 communicates with the inlet port 12 of the valve body 10 via the multiple communicating holes 411 of the diaphragm 41 and the multiple communicating openings 254 of the seal 25.

The solenoid valve 52 may be electrically connected to a circuit board for controlling. The circuit board has a sensor. With reference to FIGS. 2, 3, and 4, the solenoid valve 52 is assembled to the baffle wall 513. A second reserving space S2 is enclosed by the solenoid valve 52, the disk 511 of the assembling mount 51, and the baffle wall 513. The second reserving space S2 communicates with the flow channel 515. The solenoid valve 52 has a blocking unit 521 capable of blocking the flow channel 515. The second reserving space S2 communicates with the first reserving space S1 via the two flow holes 516.

With reference to FIGS. 2, 3, and 4, the power supply 53 is connected to the conductive wire 321 and is electrically connected to the conductive coil 32 via the conductive wire 321. The power supply 53 is electrically connected to the solenoid valve 52 via the circuit board.

With reference to FIGS. 2, 3, and 4, the covering set 60 has a fastening collar 61 and a cover 62. The fastening collar 61 has an inner thread. The fastening collar 61 is screwed with the seal 25 and presses the assembling mount 51 to force the assembling mount 51 to abut against the seal 25. The cover 62 is mounted on and around the circular wall 517 to protect the solenoid valve 52 and the power supply 53 from exposure.

With reference to FIGS. 3 and 4, the inlet port 12 of the valve body 10 is capable of connecting to a water supply. Water introduced from the water supply enters the first reserving space S1 via the multiple communicating openings 254 of the seal 25 and the multiple communicating holes 411 of the diaphragm 41. When the first reserving space S1 is filled, water enters the second reserving space S2 via the two flow holes 516 of the assembling mount 51. Since the blocking unit 521 of the solenoid valve 52 blocks the flow channel 515 to prevent water in the first reserving space S1 and the second reserving space S2 from flowing via the flow channel 515, water in the first reserving space S1 applies pressure to the diaphragm 41. The central portion of the diaphragm 41 sinks and presses the communicating ring 252 of the seal 25 to prevent the inlet port 12 and the intake end 111 of the flushing tube 11 from communicating with each other.

Figure 7:
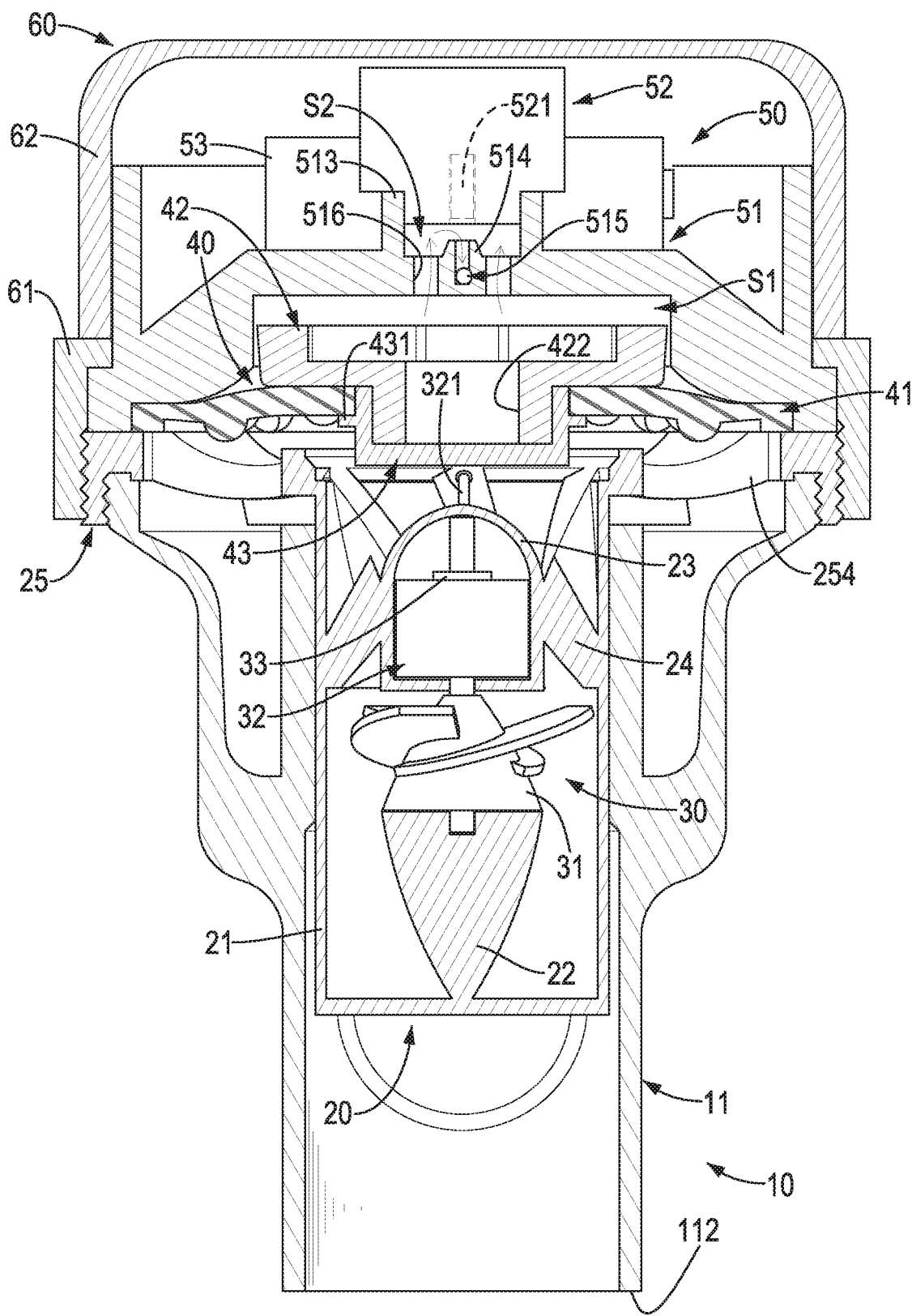
FIG. 7 is a schematic side view in partial section of the flush valve in FIG. 1, showing the water flushing.
Figure 8:
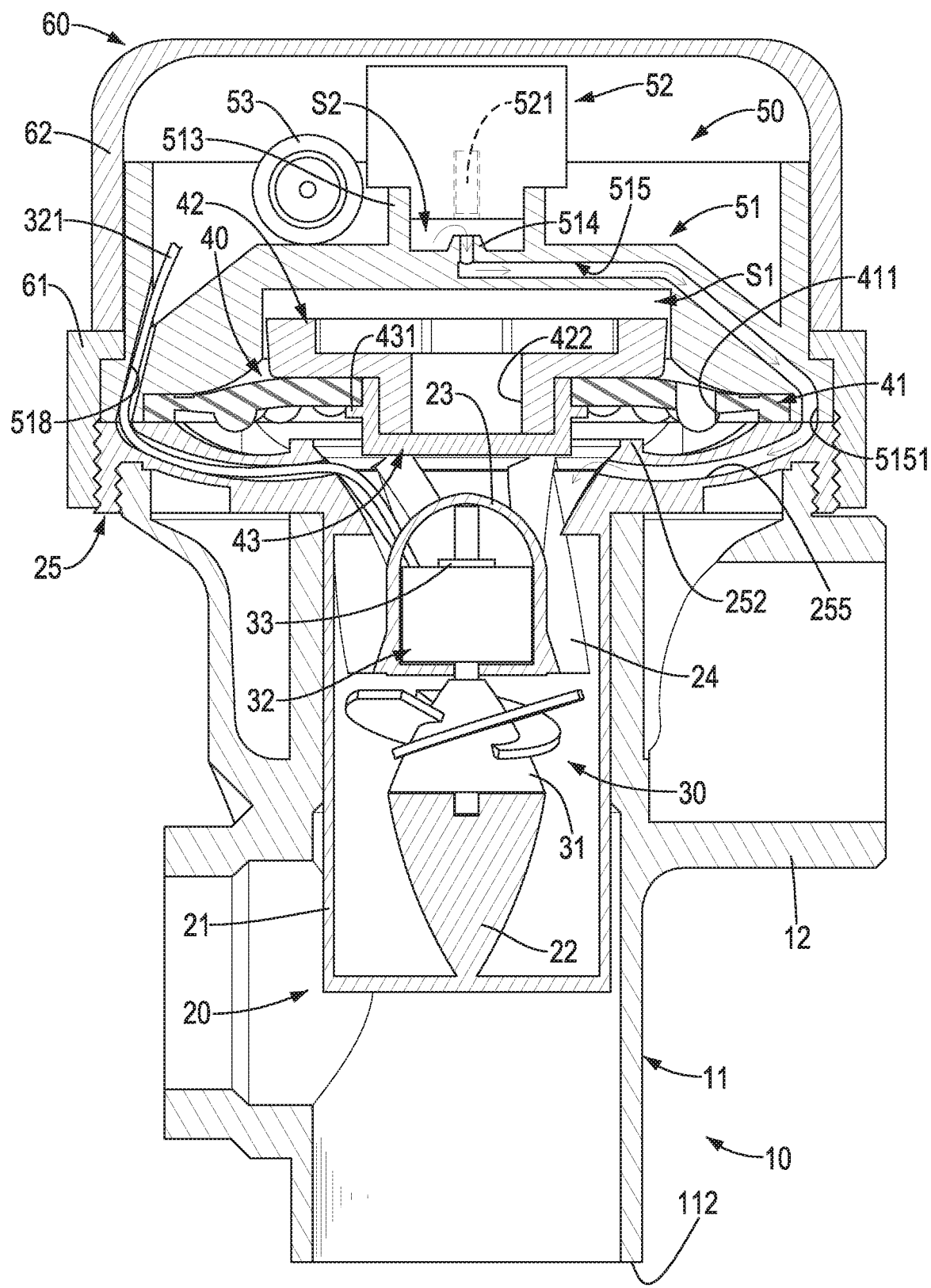
FIG. 8 is another schematic side view in partial section of the flush valve in FIG. 1, showing the water flowing.
Figure 9:
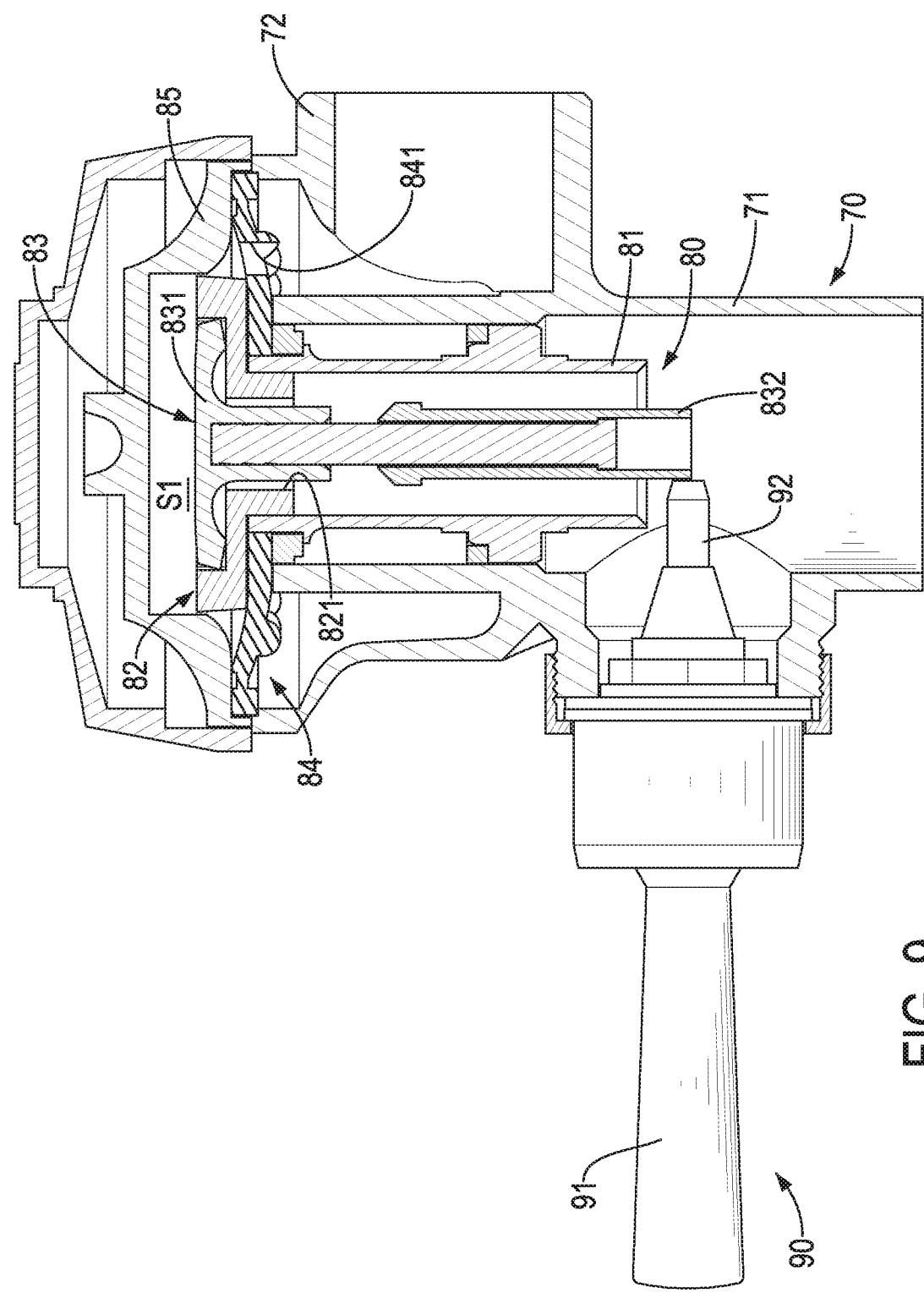
FIG. 9 is a side view in partial section of a flush valve in accordance with the prior art.
Figure 10:
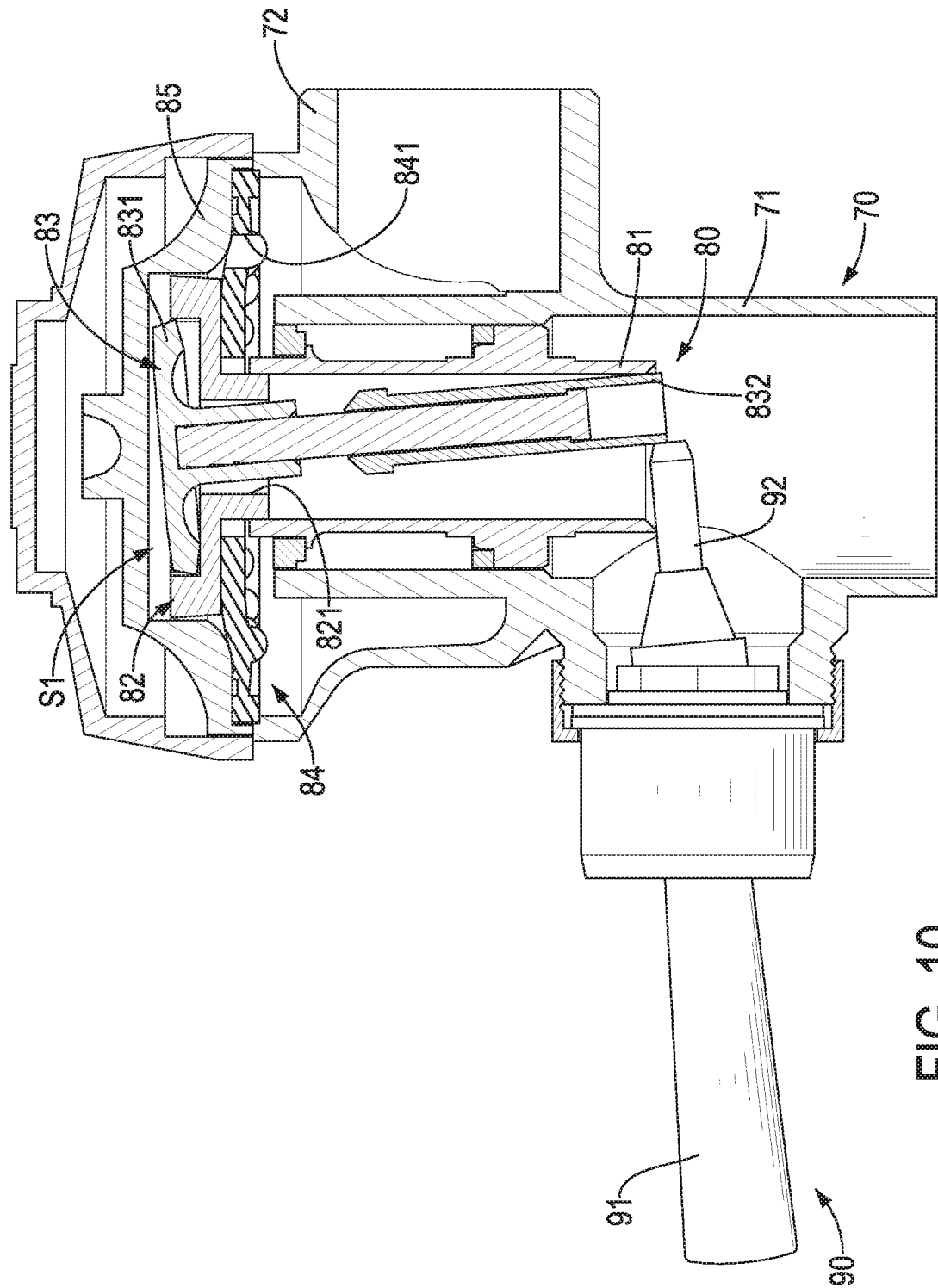
FIG. 10 is a schematic side view in partial section of the flush valve in FIG. 9.

With reference to FIGS. 7 and 8, when the sensor of the circuit board transmits signals to the solenoid valve 52, the blocking unit 521 of the solenoid valve 52 no longer blocks the flow channel 515. Water in the second reserving space S2 and the first reserving space S1 enters into one of the two channels 255 via the flow channel 515 and the opening of the flow channel 515. Then, water is conducted into the communicating ring 252 via the channel 255 and is discharged from the flushing tube 11 via the conducting tube 21.

The diaphragm 41 is no longer subjected to the pressure from the first reserving space S1. The central portion of the diaphragm 41 rises and does not press the communicating ring 252 anymore. The inlet port 12 and the intake end 111 of the flushing tube 11 communicate with each other. Water introduced from the water supply is directly guided into the flushing tube 11 via the communicating ring 252 and the conducting tube 21 and discharges at large flow.

With reference to FIGS. 7 and 8, water flowing through the conducting tube 21 drives the water turbine 31 and the magnet 33 to rotate simultaneously. The magnet 33 and the induction coil 32 generate induced current. The induced current is transmitted to the power supply 53 via the conductive wire 321.

Compared to the conventional flushing valve, the flush valve in accordance with the present invention can be electrically operated and can be modified in coordination with the urinals or squat toilets. More significantly, the flush valve in accordance with the present invention can be modified by removing the guiding member, relief valve, and seal of the conventional flush valve, and then mounting the blocking cap 43 of the relief assembly 40 to the restricting disk 42 to block the through hole 422 and to block the first reserving space S1 and the conducting tube 21, and assembling the solenoid valve assembly 50 and the covering set 60 to the conventional flush valve. With slightly changes and cooperation with the sensor, the conventional flush valve can be modified and be equipped with the sensor-operating function.

With minimum modification, the flush valve in accordance with the present invention can reduce time consumption and cost for modification. In addition, the power generation set 30 generates power while flushing can reduce inconvenience caused by regularly replacing batteries.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A flush valve comprising:
  a valve body having
    a flushing tube disposed at a central position on the valve body and having
      an axial direction;
      an intake end; and
      an outlet end opposite to the intake end in the axial direction of the flushing tube; and
    an inlet port communicating with the intake end of the flushing tube;

an assembling unit having
a seal abutting against the intake end of the flushing tube;
multiple communicating openings defined through the seal; and
at least one channel formed inside the seal and communicating with the flushing tube;
a power generating set assembled to the assembling unit, disposed inside the flushing tube, and having
a water turbine capable of rotating along the axial direction of the flushing tube;
an induction coil having a conductive wire; and
a magnet inserted through the induction coil, co-axially connected to the water turbine, and capable of simultaneously rotating with the water turbine;
a relief assembly having
a diaphragm disposed above the seal, abutting against the seal, and having at least one communicating hole defined through the diaphragm;
a restricting disk mounted through the diaphragm, disposed adjacent to the intake end of the flushing tube, and having a through hole;
a blocking cap mounted on and around the restricting disk and blocking the through hole; and
a solenoid valve assembly having
an assembling mount having
a disk with two opposite sides;
a flow channel formed inside the disk, communicating with the two opposite sides of the disk, and communicating with one of the at least one channel; and
at least one flow hole defined through the disk;
a first reserving space disposed between the disk and the relief assembly;
the at least one flow hole communicating with the first reserving space;
a solenoid valve assembled to the assembling mount and having a blocking unit selectively blocking the flow channel;
a second reserving space disposed between the solenoid valve and the assembling mount, and communicating with the flow channel and the first reserving space via the at least one flow hole; and
a power supply electrically connected to the conductive wire and electrically connected to the solenoid valve.

2. The flush valve as claimed in claim 1, wherein
the assembling unit has a turbine seat mounted by the water turbine; and
the assembling unit has a conducting tube inserted within the flushing tube and having two opposite ends;
the turbine seat is disposed within the conducting tube, and is connected to one of the two opposite ends of the conducting tube, and
the containing shell is disposed within the conducting tube and is disposed adjacent to the other end of the conducting tube.

3. The flush valve as claimed in claim 1, wherein
the seal has
a mounting ring mounted on and around the valve body;
a communicating ring disposed within the mounting ring and communicating with the flushing tube; and
multiple connecting portions disposed around the communicating ring separately; and the at least one channel is formed through one of the multiple connecting portions and extends inside the communicating ring to communicate with the flushing tube.

4. The flush valve as claimed in claim 3, wherein
the assembling unit has a turbine seat mounted by the water turbine; and
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

5. The flush valve as claimed in claim 3, wherein
the assembling mount has
a reserving recess disposed at one of the two opposite sides of the disk and defined in a central portion of the disk; and
a baffle wall being circular, disposed at the other one of the two opposite sides of the disk, and connected to the central portion of the disk;
the first reserving space is formed by the reserving recess;
the flow channel extends from the central portion of the disk within the baffle wall and communicates with the at least one channel;
the at least one flow hole is defined through the central portion of the disk within the baffle wall and communicates with the reserving recess; and
the solenoid valve is assembled to the baffle wall.

6. The flush valve as claimed in claim 5, wherein
the assembling unit has a turbine seat mounted by the water turbine; and
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

7. The flush valve as claimed in claim 5, wherein
the assembling unit has
a turbine seat mounted by the water turbine; and
a containing shell being hollow; and
the induction coil and the magnet are assembled within the containing shell.

8. The flush valve as claimed in claim 7, wherein
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

9. The flush valve as claimed in claim 7, wherein
the assembling unit has
a conducting tube inserted within the flushing tube; and
multiple diverging ribs disposed within the flushing tube and surround the containing shell;
wherein each one of the multiple diverging ribs spirally extends from the conducting tube to the containing shell according to the containing shell and is connected to both the containing shell and the conducting tube.

10. The flush valve as claimed in claim 9, wherein
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

11. The flush valve as claimed in claim 9, wherein
the assembling mount has a conical protrusion disposed at the central portion of the disk and within the baffle wall; and
the flow channel is defined through the conical protrusion.

12. The flush valve as claimed in claim 11, wherein
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

13. The flush valve as claimed in claim 11, wherein
the assembling mount has a circular wall connected to the disk and surrounding the baffle wall; and
the flush valve has a covering set having
a fastening collar screwed with the seal and pressing the assembling mount; and
a cover mounted on and around the circular wall.

14. The flush valve as claimed in claim 13, wherein
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

15. The flush valve as claimed in claim 13, wherein
the at least one channel includes two channels;
the assembling mount has a wiring hole defined through the disk and aligned with one of the two channels;
the conductive wire passes through the wiring hole and the one of the two channels to electrically connect the power supply; and
the communicating channel has an opening aligned with the other one of the two channels.

16. The flush valve as claimed in claim 15, wherein
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

17. The flush valve as claimed in claim 15, wherein
the blocking cap is inserted in the diaphragm, clamped by the diaphragm and the restricting disk, and has a flange being circular and abutting against the diaphragm.

18. The flush valve as claimed in claim 17, wherein
the assembling unit has a conducting tube inserted within the flushing tube and having two opposite ends;
the turbine seat is disposed within the conducting tube, and is connected to one of the two opposite ends of the conducting tube; and
the containing shell is disposed within the conducting tube and is disposed adjacent to the other end of the conducting tube.

\* \* \* \* \*